(12) United States Patent
Cruz-Albrecht et al.

(10) Patent No.: US 9,824,311 B1
(45) Date of Patent: Nov. 21, 2017

(54) ASYNCHRONOUS PULSE DOMAIN PROCESSOR WITH ADAPTIVE CIRCUIT AND RECONFIGURABLE ROUTING

(71) Applicant: HRL Laboratories, LLC, Malibu, CA (US)

(72) Inventors: Jose Cruz-Albrecht, Oak Park, CA (US); Peter Petre, Oak Park, CA (US); Randall White, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 859 days.

(21) Appl. No.: 14/259,314

(22) Filed: Apr. 23, 2014

(51) Int. Cl.
  G06F 15/18      (2006.01)
  G06N 3/08       (2006.01)

(52) U.S. Cl.
  CPC ..................... *G06N 3/08* (2013.01)

(58) Field of Classification Search
  USPC .......................................................... 706/25
  See application file for complete search history.

(56) References Cited

U.S. PATENT DOCUMENTS

| | | | |
|---|---|---|---|
| 7,403,144 B1 | 7/2008 | Cruz-Albrecht et al. | |
| 7,822,698 B1 | 10/2010 | Cruz-Albrecht et al. | |
| 8,390,500 B1 * | 3/2013 | Srinivasa | G06N 3/049 341/161 |
| 8,566,265 B1 * | 10/2013 | Cruz-Albrecht | G06N 3/049 706/27 |
| 8,595,157 B2 * | 11/2013 | Cruz-Albrecht | G06N 3/049 706/12 |
| 8,659,656 B1 * | 2/2014 | Cruz-Albrecht | G06K 9/0063 341/138 |
| 8,755,564 B1 * | 6/2014 | Kukshya | G06K 9/00496 382/103 |
| 8,930,291 B1 * | 1/2015 | Srinivasa | G06N 3/049 706/12 |
| 8,959,040 B1 * | 2/2015 | Cruz-Albrecht | G06N 3/049 706/39 |
| 8,977,578 B1 * | 3/2015 | Cruz-Albrecht | G06N 3/04 706/12 |
| 8,996,431 B2 * | 3/2015 | Cruz-Albrecht | G06N 3/02 706/15 |
| 9,082,075 B1 * | 7/2015 | Cruz-Albrecht | G06N 3/049 |
| 9,154,172 B1 * | 10/2015 | Cruz-Albrecht | H03K 3/86 |
| 9,484,918 B1 * | 11/2016 | Kuan | H03K 3/86 |

(Continued)

OTHER PUBLICATIONS

Simple pulse asynchronous state machines J. Miller; W. Yang 1996 IEEE International, Symposium on Circuits and Systems. Circuits and Systems Connecting the World. ISCAS 96 Year: 1996, pp. 405-409 541619 IEEE Conference Publications.*

(Continued)

*Primary Examiner* — Michael B Holmes
(74) *Attorney, Agent, or Firm* — Ladas & Parry

(57) ABSTRACT

A liquid state machine pulse domain neural processor circuit comprising an asynchronous input filter circuit provided for, at any given time, receiving a series of analog input signals and generating in response a set of time-encoded values that depend on the series of analog input signals received at said given time and before said given time; and an asynchronous trainable readout map circuit for transforming at least a portion of said set of time encoded values into output signals.

21 Claims, 7 Drawing Sheets

(56) References Cited

U.S. PATENT DOCUMENTS 9,697,462 B1 * 7/2017 Cruz-Albrecht ......... G06N 3/04

OTHER PUBLICATIONS

Liquid state machine based pattern recognition on FPGA with firing-activity dependent power gating and approximate computing Qian Wang; Youjie Li; Peng Li 2016 IEEE International Symposium on Circuits and Systems (ISCAS) Year: 2016 pp. 361-364, DOI: 10.1109/ISCAS.2016.7527245 IEEE Conference Publications.*

Methodology and Design of a Massively Parallel Memristive Stateful IMPLY Logic-Based Reconfigurable Architecture Kamela C. Rahman; Dan Hammerstrom; Yiwei Li; Hongyan Castagnaro; Marek A. Perkowski IEEE Transactions on Nanotechnology Year: 2016, vol. 15, Issue: 4 pp. 675-686, DOI: 10.1109/TNANO.2016.2572726 IEEE Journals & Magazines.*

General-purpose LSM learning processor architecture and theoretically guided design space exploration Qian Wang; Yingyezhe Jin; Peng Li 2015 IEEE Biomedical Circuits and Systems Conference (BioCAS) Year: 2015 pp. 1-4, DOI: 10.1109/BioCAS.2015.7348397 IEEE Conference Publications.*

A neural-network-based space-vector PWM controller for a three-level voltage-fed inverter induction motor drive S. K. Mondal; J. O. P. Pinto; B. K. Bose IEEE Transactions on Industry Applications Year: 2002, vol. 38, Issue: 3 pp. 660-669, DOI: 10.1109/TIA.2002.1003415 IEEE Journals & Magazines.*

U.S. Appl. No. 13/535,114, Cruz-Albrecht et al., filed Jun. 27, 2012.

W. Maass et al, "Realtime computing without stable states: A new framework for neural computation based on perturbations," Neural Computation, vol. 14, No. 11, pp. 2531-2560, (2002).

B. Schrauwen, "Compact hardware for real-time speech recognition using a Liquid State Machine," Proceedings of International Joint Conference on Neural Networks, Orlando, Florida, USA, (Aug. 12-17, 2007).

A.A. Lazar and L.T Toth, "Perfect Recovery and Sensitivity Analysis of Time Encoded Bandlimited Signals" IEEE Trans. on Circuits and Systems—I, vol. 51, No. 10, pp. 2060-2073, (Oct. 2004).

"Max II Device Handbook", Altera Corporation, (Aug. 2009).

"LT6230/LT6231/LT6232 datasheet", Linear Technology Corporation.

D. A. Johns, W. M. Snelgrove and A. S. Sedra, "Continuous-Time LMS Adaptive Recursive Filters," IEEE Trans. on Circuits and Systems, Vo. 38, No. 7, pp. 769-778, (Jul. 1991).

* cited by examiner

ASYNCHRONOUS PULSE DOMAIN PROCESSOR WITH ADAPTIVE CIRCUIT AND RECONFIGURABLE ROUTING

STATEMENT REGARDING FEDERALLY SPONSORED RESEARCH OR DEVELOPMENT

The present invention was made with support in part from the United States Government under Grant number N00014-12-C-0027 (WB Cognitive Channelizer). The United States Government has certain rights in the invention.

RELATED APPLICATIONS

The present application does not claim priority of any previous patent application.

FIELD OF THE INVENTION

The present invention relates generally to neural processors, and in particular pulse domain neural processors.

BACKGROUND

A key challenge for neural modeling is to explain how a continuous stream of multi-modal input from a rapidly changing environment can be processed by stereotypical recurrent circuits of integrate-and-fire neurons in real-time. Alternative computational model for real-time computing on time-varying input that provides an alternative to paradigms based on Turing machines or attractor neural networks. An alternative computational model is for example a "Liquid State Machine" such as described in: W. Maass et al, "*Realtime computing without stable states: A new framework for neural computation based on perturbations*," Neural Computation, vol. 14, no. 11, pp. 2531.2560, 2002", which does not require a task-dependent construction of neural circuits.

FIG. 1 illustrates a model of a Liquid State Machine neural processor 10, wherein a function of time (time series) 12 is injected as input into a "liquid filter" 14, creating at any given time t a "liquid state" 16 which is transformed by a memory-less readout map 18 to generate an output 20.

The input function 12 can be a continuous sequence of disturbances, and the target output 20 can be some chosen function of time that provides a real-time analysis of this sequence. In order for the Liquid State Machine 10 to map input functions of time 12 to output functions of time 20, the Liquid State Machine generates, at every time t, an internal "liquid state" 16, which constitutes its current response to preceding perturbations, i.e., to preceding inputs. In contrast to the "finite state" of a finite state machine (or finite automaton) the liquid state 16 consists of analog values that may change continuously over time.

Importantly, whereas the state set and the state transition function of a finite state machine is in general constructed for a specific task, the liquid states and the transitions between them need not be customized for a specific task. In a physical implementation this liquid state can consist of all information about the current internal state of a dynamical system that is accessible to the readout modules.

In mathematical terms, this liquid state is simply the current output of some operator or filter 14 that maps input functions 12 onto functions 16. In contrast to the liquid filter 14, the readout map 18 can in general be chosen in a task-specific manner. There can actually be many different readout maps, that extract different task-specific information in parallel from the current output of filter 14.

B. Schrauwen, "Compact hardware for real-time speech recognition using a Liquid State Machine," Proceedings of International Joint Conference on Neural Networks," Orlando, Fla., USA, Aug. 12-17, 2007 discloses an implementation of real-time, isolated digit speech recognition using a Liquid State Machine as a recurrent neural network of spiking neurons where only the output layer is trained. This implementation provides a scalable, serialised architecture that allows a compact implementation of spiking neural networks that is still fast enough for real-time processing. However, this implementation is based in digital circuitry and is not suited for low power applications.

There exists a need for an implementation of a Liquid State Machine suitable for low power applications.

SUMMARY

The present disclosure relates to circuits of Liquid State Machine neural processors provided for operating in the pulse domain, and related methods of processing.

An embodiment of the present disclosure comprises a liquid state machine pulse domain neural processor circuit having: an asynchronous input filter circuit provided for, at any given time, receiving a series of analog input signals and generating in response a set of time-encoded values that depend on the series of analog input signals received at said given time and before said given time; and an asynchronous trainable readout map circuit for transforming at least a portion of said set of time encoded values into output signals.

According to an embodiment of the present disclosure, the asynchronous input filter circuit comprises: an input driver circuit for receiving each analog input signal on a distinct input driver input port and for outputting on a corresponding input driver output port a pulse signal comprising a series of pulses having a predetermined frequency and having a duty cycle that depends on the value of the analog input signal; a plurality of asynchronous nodes; a plurality of asynchronous pulse domain processing cells having each an output port and a plurality of input ports; a plurality of input port switches for controllably connecting any input port of any asynchronous pulse domain processing cell to any input driver output port; a plurality of node switches for controllably connecting any asynchronous node to any input port of any asynchronous pulse domain processing cell; and a plurality of output port switches for controllably connecting the output port of any asynchronous pulse domain processing cell to any asynchronous node.

According to an embodiment of the present disclosure, the input port switches, node switches and output port switches are controllable such that at any given time the asynchronous input filter generates on the plurality of asynchronous nodes said set of time-encoded values that depends on the series of analog input signals received at said given time and before said given time.

According to an embodiment of the present disclosure, each asynchronous pulse domain processing cell comprises: a summing circuit having as many inputs as the asynchronous pulse domain processing cell has input ports; a plurality of controllable weighing circuits having each an input coupled to an input port of the asynchronous pulse domain processing cell and an output coupled to an input of the summing circuit; and a time encoder circuit having an input coupled to the output of the summing circuit.

According to an embodiment of the present disclosure, the time encoder circuit comprises: a two input summing integrator having an input coupled to the input of the time encoder circuit; and a hysteresis quantizer having an input coupled to the output of the two input summing integrator and an output coupled to the output of the time encoder circuit; wherein the output of the hysteresis quantizer is also connected to the second input of the two-input summing integrator.

According to an embodiment of the present disclosure, the summing circuit of the asynchronous pulse domain processing cell is a lossy summing integrator.

According to an embodiment of the present disclosure, the liquid state machine pulse domain neural processor circuit comprises a non linear limiter between the lossy summing integrator and the input of the time encoder circuit.

According to an embodiment of the present disclosure, each controllable weighing circuit comprises a one-bit DAC arranged for receiving a pulse input signal having input signal levels and for generating an output signal identical to the input signal but having output signal levels that differ from the input signal levels by a programmable factor.

According to an embodiment of the present disclosure, each a one-bit DAC has an adjustable gain controlled by a DAC receiving in input a digital value stored in a programmable memory.

According to an embodiment of the present disclosure, the asynchronous trainable readout map circuit comprises: a plurality of trainable asynchronous pulse domain processing cells having each an output port and a plurality of input ports associated each to a weighing port; a plurality of adaptation cells associated each to a trainable asynchronous pulse domain processing cell, each adaptation cell being provided for receiving the signal output on the output port of its associated trainable asynchronous pulse domain processing cell, receiving a training target output signal and supplying weighing factors to the weighing ports of its associated trainable asynchronous pulse domain processing cell; and a plurality of readout map switches for controllably connecting any asynchronous node of the input filter circuit to any input port of any trainable asynchronous pulse domain processing cell.

According to an embodiment of the present disclosure, each adaptation cell is provided for generating weighing factors that depend on the integration, over a training time, of the difference between a low pass filtering of said signal output on the output port of its associated trainable asynchronous pulse domain processing cell and said training target output signal.

According to an embodiment of the present disclosure, each trainable asynchronous pulse domain processing cell comprises: a summing circuit having as many inputs as the trainable asynchronous pulse domain processing cell has input ports; and a plurality of controllable weighing circuits having each an input coupled to an input port of the asynchronous pulse domain processing cell and an output coupled to an input of the summing circuit.

According to an embodiment of the present disclosure, each trainable asynchronous pulse domain processing cell comprises a delay circuit between each input port and the input of the controllable weighing circuit that is coupled to the input port.

According to an embodiment of the present disclosure, each adaptation cell comprises: a low pass filter having an input connected to the output port of its associated trainable asynchronous pulse domain processing cell; a subtractor circuit for subtracting the output of the low pass filter to a training target output signal received on a training signal input port; a plurality of controllable weighing circuits having each an input coupled to an input port of its associated trainable asynchronous pulse domain processing cell, and a weighing control input coupled to the output of the subtractor circuit; and a plurality of integrator circuits having each an input connected to the output of a controllable weighing circuit and an output connected to the weighing port associated to the input port to which the controllable weighing circuit is connected.

An embodiment of the present disclosure comprises a method of processing a series of analog input signals; the method comprising: providing a liquid state machine pulse domain neural processor circuit having an asynchronous input filter circuit provided for, at any given time, receiving a series of analog input signals and generating in response a set of time-encoded values that depends on the series of analog input signals received at said given time and before said given time; and an asynchronous trainable readout map circuit for transforming at least a portion of said set of time encoded values into output signals; providing training analog input signals to the asynchronous input filter circuit as well as corresponding training output signals to the asynchronous trainable readout map circuit during a training period; and after the training period, providing analog input signals to be processed to the asynchronous input filter circuit and outputting the corresponding output signals from the asynchronous trainable readout map circuit.

According to an embodiment of the present disclosure, providing analog input signals to be processed to the asynchronous input filter circuit comprises: generating for each analog input signal a corresponding pulse signal comprising a series of pulses having a predetermined frequency and having a duty cycle that depends on the value of the analog input signal; providing each pulse signal to at least one of a plurality of asynchronous pulse domain processing cells programmably interconnected for form a processing network.

According to an embodiment of the present disclosure, providing pulse signals to an asynchronous pulse domain processing cell comprises: summing the pulse signals and generating an output pulse signal comprising a series of pulses having said predetermined frequency and having a duty cycle that depends on the value of the sum of the pulse signals.

According to an embodiment of the present disclosure, the method further comprises assigning a predetermined weighing factor to each pulse signal prior to summing the pulse signals.

According to an embodiment of the present disclosure, summing the pulse signals comprises calculating a lossy summing integration of the pulse signals.

According to an embodiment of the present disclosure, the method further comprises providing pulse signals output by said processing network to trainable asynchronous pulse domain processing cells, wherein said providing pulse signals to a trainable asynchronous pulse domain processing cell comprises: generating an output signal comprising the sum of said pulse signals; wherein said pulse signals are weighed with the integration over said training period of said pulse signals during said training period, said pulse signals during said training period being themselves weighed with the difference during said training period between a low pass filtering of the sum of said pulse signals and a training expected output value.

According to an embodiment of the present disclosure, the method further comprises delaying each pulse signal prior to summing the pulse signals.

BRIEF DESCRIPTION OF THE DRAWINGS

The invention(s) may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
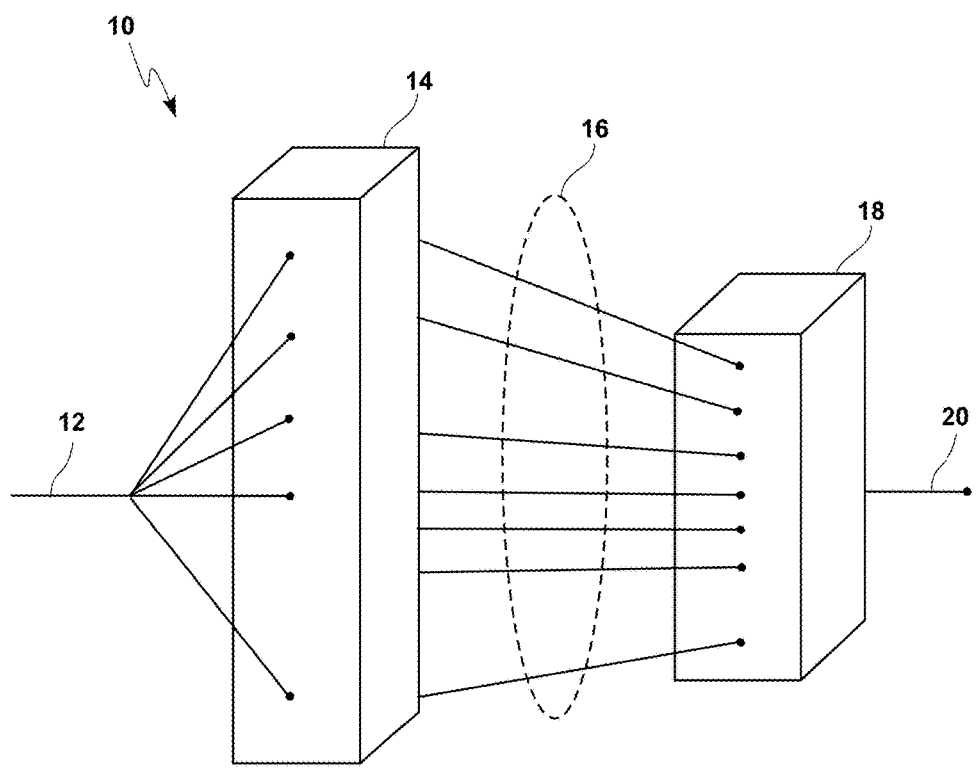
FIG. 1 illustrates a model of a Liquid State Machine neural processor.
Figure 2:
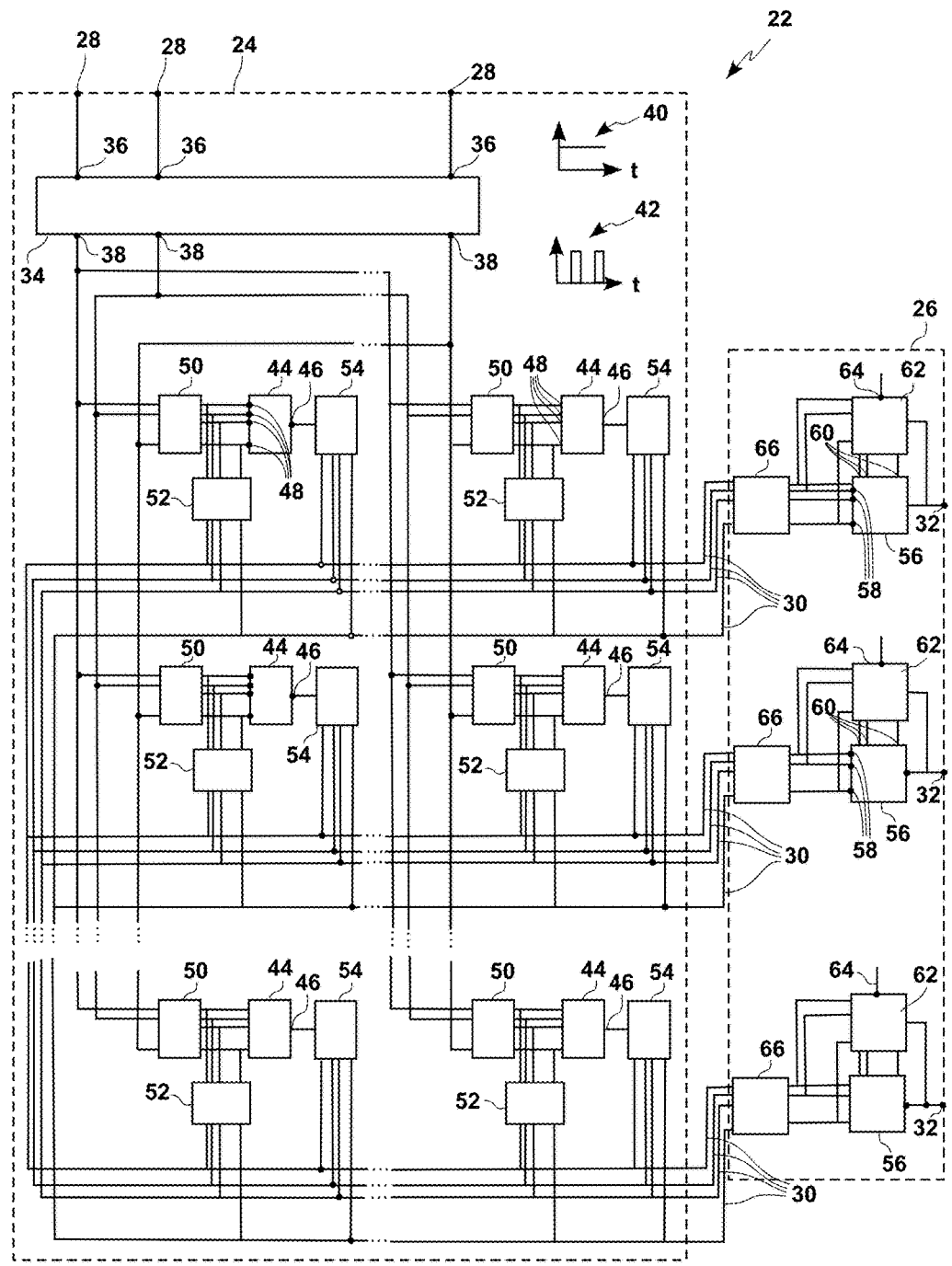
FIG. 2 illustrates a circuit of a Liquid State Machine neural processor according to an embodiment of the present disclosure.

FIG. 2 illustrates a circuit 22 of a Liquid State Machine neural processor according to an embodiment of the present disclosure, comprising an asynchronous input filter circuit 24 and an asynchronous trainable readout map circuit 26.

According to an embodiment of the present disclosure, asynchronous input filter circuit 24 is provided for, at any given time, receiving on input ports 28 a series of analog input signals and generating in response on a plurality of asynchronous nodes 30 a set of time-encoded values or signals that depend on the series of analog input signals received at said given time and before said given time. According to an embodiment of the present disclosure, asynchronous trainable readout map circuit 26 is provided for transforming at least a portion of the set of time encoded values or signals generated by the asynchronous input filter circuit 24 on at least a portion of asynchronous nodes 30 into output signals on output nodes 32.

According to an embodiment of the present disclosure, the asynchronous input filter circuit 24 comprises an input driver circuit 34 for receiving each analog input signal on a distinct input driver input port 36, and for outputting on a corresponding input driver output port 38 an output pulse signal comprising a series of pulses having a predetermined frequency and having a duty cycle that depends on the value of the analog input signal. FIG. 2 illustrates one exemplary analog input signal 40 such as those that can be received on input ports 36, as well as a corresponding exemplary output pulse signal 42 that can be generated on an output port 38 by the input driver circuit 34 in response to input signal 40. According to an embodiment of the present disclosure, output signal 42 comprises pulses having a predetermined amplitude and a predetermined frequency, wherein the duty cycle of the pulses is related to the analog value of input signal 40. According to an embodiment of the present disclosure, if the value of input signal varies in time, the duty cycle of the pulses of output signal 42 varies correspondingly.

According to an embodiment of the present disclosure, the amplitude of the output signal 42 can be of +/−1.65V. According to an embodiment of the present disclosure, the frequency of the output signal 42 can be of 2 MHz. According to an embodiment of the present disclosure, the frequency of the output signal 42 can be comprised between 100 Hz and 30 GHz.

According to an embodiment of the present disclosure, the asynchronous input filter circuit 24 comprises a plurality of asynchronous pulse domain processing cells 44 having each an output port 46 and a plurality of input ports 48. According to an embodiment of the present disclosure, the asynchronous input filter circuit 24 comprises a plurality of input port switches 50 for controllably connecting any input port 48 of any asynchronous pulse domain processing cell 44 to any input driver output port 38. According to an embodiment of the present disclosure, a switch 50 has a number of inputs that can be equal to the number of ports 38 of input driver circuit 34 and a number of outputs equal to the number of inputs of cell 44.

According to an embodiment of the present disclosure, the asynchronous input filter circuit 24 comprises a plurality of node switches 52 for controllably connecting any asynchronous node 30 to any input port 48 of any asynchronous pulse domain processing cell 44. According to an embodiment of the present disclosure, a switch 52 has a number of inputs that can be equal to the number of asynchronous nodes 30 and a number of outputs that can be equal to the number of inputs of cell 44.

According to an embodiment of the present disclosure, the asynchronous input filter circuit 24 comprises a plurality of output port switches 54 for controllably connecting the output port 46 of any asynchronous pulse domain processing cell 44 to any asynchronous node 30. According to an embodiment of the present disclosure, a switch 54 has one input and has a number of outputs that can be equal to the number of asynchronous nodes 30.

According to an embodiment of the present disclosure, the input port switches 50, node switches 52 and output port switches 54 are controllable to configure or reconfigure the connections of the input ports 48 and output ports 46 of processing cells 44 according to a desired connectivity pattern. According to an embodiment of the present disclosure, the processing cells can be connected together in a reconfigurable manner along a desired connectivity pattern such that their output at any given time depends on their output or the output of other processing cells before said given time.

According to an embodiment of the present disclosure, a desired connectivity pattern can comprise having the output port 46 of any processing cell 44 connected to one input port 48 of all the immediate neighboring processing cells 44. According to an embodiment of the present disclosure, a desired connectivity pattern can comprise having the output port 46 of any processing cell 44 connected to one input port 48 of random processing cells 44. According to an embodiment of the present disclosure, a desired connectivity pattern can also include recurrent loops (the output of a node can be connected back to one of its own inputs).

According to an embodiment of the present disclosure, the signals generated by the input filter 24 on asynchronous nodes 30 depend on the connectivity pattern obtained by controlling the input port switches 50, node switches 52 and output port switches 54. The connectivity pattern can be changed according to the desired use of the input filter; the nature of the signals input to the input filter, etc. . . . .

According to an embodiment of the present disclosure, the asynchronous trainable readout map circuit 26 comprises a plurality of trainable asynchronous pulse domain processing cells 56 having each an output port 32, a plurality of input ports 58 and a plurality of weighing ports 60 associated each to an input port 58. According to an embodiment of the present disclosure, the asynchronous trainable readout map circuit 26 comprises a plurality of adaptation cells 62 associated each to a trainable asynchronous pulse domain processing cell 56. According to an embodiment of the present disclosure each adaptation cell 62 is provided for receiving the signal output on the output port 32 of its associated trainable asynchronous pulse domain processing cell 56; receiving a training target output signal on a training port 64; and supplying weighing factors to the weighing ports 60 of its associated trainable asynchronous pulse domain processing cell 56.

According to an embodiment of the present disclosure, the asynchronous trainable readout map circuit 26 comprises a plurality of readout map switches 66 for controllably connecting any asynchronous node 30 of the input filter circuit 24 to any input port 58 of any trainable asynchronous pulse domain processing cell 54. According to an embodiment of the present disclosure, a switch 66 has a number of inputs that can be equal to the number of asynchronous nodes 30 and a number of outputs that can be equal to the number of input ports 58 of trainable asynchronous pulse domain processing cells 56.

An embodiment of the present disclosure comprises a method of processing a series of analog input signals, for example using the liquid state machine pulse domain neural processor circuit 22 by, at any given time, receiving a series of analog input signals on input ports 28 and generating in response on asynchronous nodes 30 a set of time-encoded values that depends on the series of analog input signals received at said given time and before said given time.

According to an embodiment of the present disclosure, the method comprises providing training analog input signals to the asynchronous input filter circuit on input ports 28 as well as corresponding training output signals on ports 64 of the asynchronous trainable readout map circuit 26 during a training period; and after the training period, providing analog input signals to be processed to the asynchronous input filter circuit 24 and outputting the corresponding output signals from the asynchronous trainable readout map circuit on ports 32.

Figure 3:
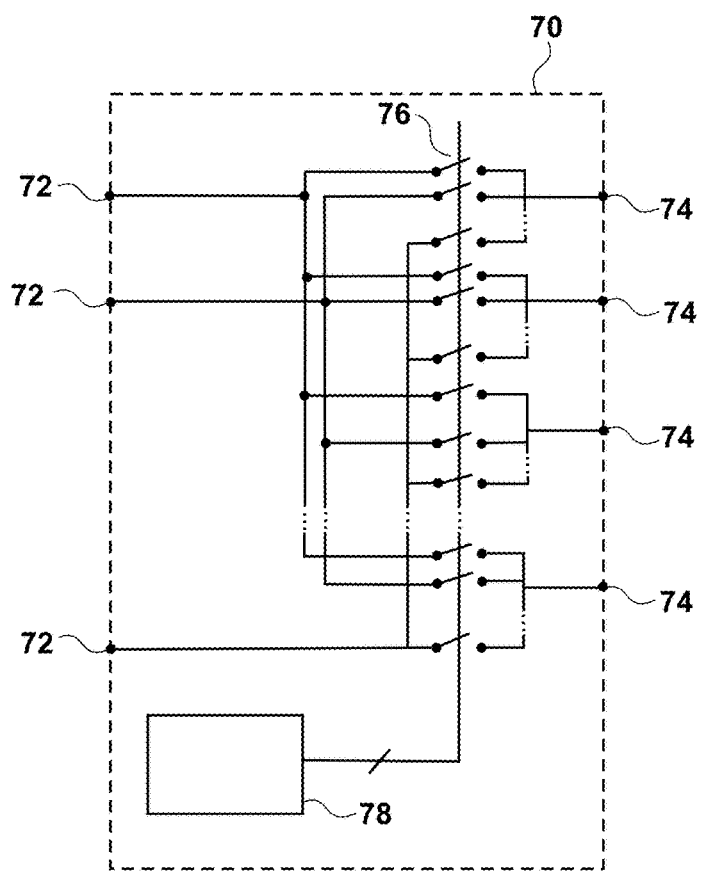
FIG. 3 illustrates a switch element of the circuit of FIG. 2.

FIG. 3 illustrates a switch element 70 of the circuit of FIG. 2. According to an embodiment of the present disclosure, any of the input port switches 50, the node switches 52, the output port switches 54 and the readout map switches 66 have the structure of switch element 70, with the appropriate change in number of input and output ports.

According to an embodiment of the present disclosure, switch element 70 comprises one or a plurality of input ports 72, and a plurality of output ports 74. According to an embodiment of the present disclosure, each input port 72 is connected by a series of controllable switches 76 to each output port 74. According to an embodiment of the present disclosure, each one of the controllable switches is controllable by data stored in a programmable memory, such as a RAM, 78. According to an embodiment of the present disclosure, programming the memory 78 of the input port switches 50, node switches 52 and output port switches 54 allows arranging the connection of the processing cells 44 along the desired connectivity pattern.

Figure 4:
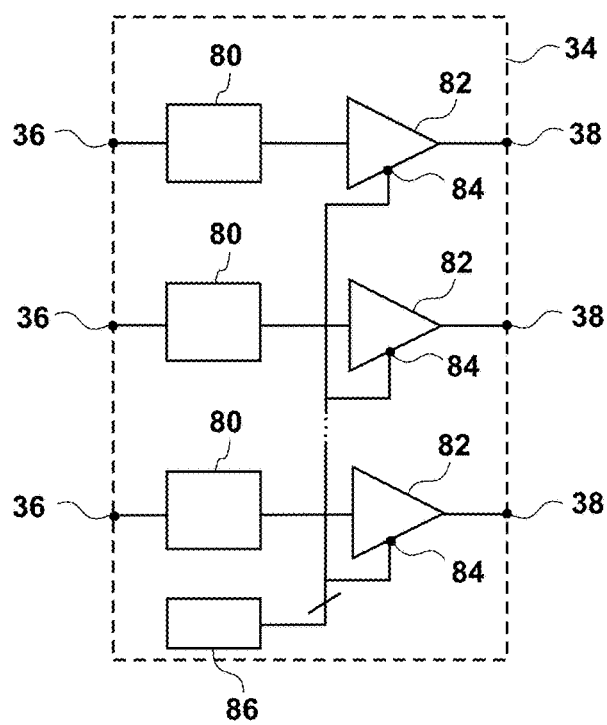
FIG. 4 illustrates an input driver of the circuit of FIG. 2.

FIG. 4 illustrates input driver 34 of circuit 22. According to an embodiment of the present disclosure, each input port 36 of input driver 34 is coupled to the input of a time encoder circuit 80, the output of the time encoder circuit 80 being coupled to the input of a buffer circuit 82. The output of one-bit buffer circuit 82 is coupled to the output ports 38 of input driver 34. According to an embodiment of the present disclosure, time encoder circuit 80 is provided for, upon receipt of an analog input signal on its input, providing on its output an output pulse signal comprising a series of pulses having a predetermined frequency and having a duty cycle that depends on the value of the analog input signal. According to an embodiment of the present disclosure, the pulse signal output by time encoder 80 has an amplitude that alternates between predetermined minimum and maximum output signal values. According to an embodiment of the present disclosure, buffer circuit 82 comprises a one-bit DAC arranged for generating a pulse output signal identical to the pulse input signal received from the time encoder 80, but having an amplitude that differs from the amplitude of the input signal by a programmable factor. According to an embodiment of the present disclosure, buffer circuit 82 has an adjustable gain that is controlled by a digital value, or programmable factor, received on a gain control port 84 from a programmable memory such as a RAM 86.

Figure 5:
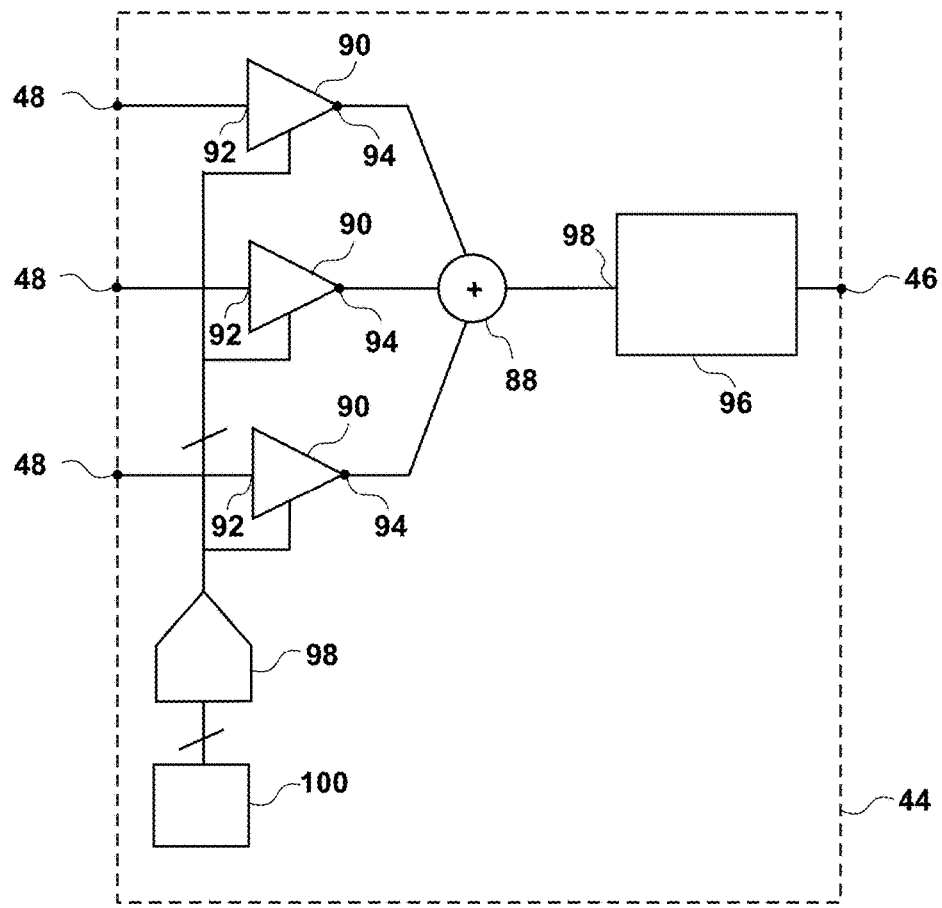
FIG. 5 illustrates a processing cell of the circuit of FIG. 2.

FIG. 5 illustrates an asynchronous pulse domain processing cell 44 of asynchronous input filter circuit 24. According to an embodiment of the present disclosure, asynchronous pulse domain processing cell 44 comprises a summing circuit 88 having as many inputs as the asynchronous pulse domain processing cell 44 has input ports 48. According to an embodiment of the present disclosure, asynchronous pulse domain processing cell 44 comprises a plurality of controllable weighing circuits 90 having each an input 92 coupled to an input port 48 and an output 94 coupled to an input of the summing circuit 88. According to an embodiment of the present disclosure, asynchronous pulse domain processing cell 44 comprises a time encoder circuit 96 having an input 98 coupled to the output of the summing circuit 88. The output of time encoder circuit 96 is coupled to output port 46. According to an embodiment of the present disclosure, each weighing circuit 90 is provided for, upon receipt of an input pulse signal, providing on its output an output pulse signal identical to the input pulse signal but having an amplitude that differs from the amplitude of the input signal by a programmable factor. According to an embodiment of the present disclosure, each weighing circuit 90 can be a one-bit DAC. According to an embodiment of the present disclosure, each one-bit DAC has an adjustable gain controlled by a DAC 98 receiving in input a digital value stored in a programmable memory 100, such as a RAM.

Figure 6:
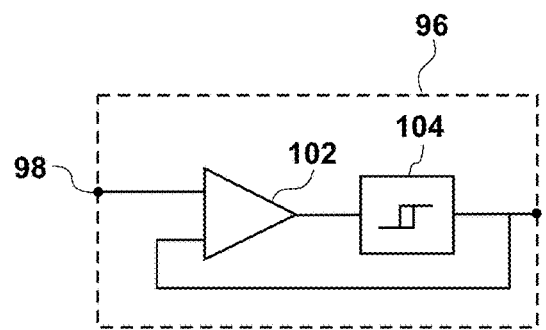
FIG. 6 illustrates a time encoder of the processing cell of FIG. 5.

FIG. 6 illustrates a time encoder circuit such as time encoder circuit 96 of FIG. 5. According to an embodiment of the present disclosure, time encoder circuit 96 comprises a two input summing integrator 102 having a first input coupled to the input 98 of the time encoder circuit 96. According to an embodiment of the present enclosure, time encoder circuit 96 comprises a hysteresis quantizer 104 having an input coupled to the output of the two input summing integrator 102 and an output coupled to the output of the time encoder circuit 96, wherein the output of the hysteresis quantizer 104 is also connected to the second input of the two-input summing integrator 102. According to an embodiment of the present disclosure, hysteresis quantizer 104 can use a Schmitt trigger circuit. According to an embodiment of the present disclosure, hysteresis quantizer 104 can comprise a continuous-time comparator, with hysteresis produced by resistive positive feedback. According to an embodiment of the present disclosure, hysteresis voltage can be tunable by an eight-bit adjustment byte, providing tunability of the free-running pulse-rate of time-encoder. According to an embodiment of the present disclosure, a standard digital logic inverter can then follow the comparator output, and serve to produce a clean, symmetric logic pulse with voltage levels of +/−1.65V. According to an embodiment of the present disclosure, an optional one-shot generator (not shown) can be provided for experiments with spiking-mode operation.

According to an embodiment of the present disclosure, summing integrator 102 can be a lossy summing integrator. According to an embodiment of the present disclosure, time encoder circuit 80 of FIG. 4 can have the same structure as time encoder 96 of FIG. 6. According to an embodiment of the present disclosure, time encoder circuits 80 or 96 can be such as the time encoder circuits described in A. A. Lazar and L. T Toth, "Perfect Recovery and Sensitivity Analysis of Time Encoded Bandlimited Signals" IEEE Trans. on Circuits and Systems—I, vol. 51, no. 10, pp. 2060-2073, October 2004; or in J. Cruz-Albrecht and P. Petre, "Pulse Domain Encoder and Filter Circuits," U.S. Pat. No. 7,403,144, July 2008, which are hereby incorporated by reference.

According to an embodiment of the present disclosure, the predetermined frequency in output of time encoder circuit 80 or 96 remains unchanged when the value of the analog input signal on its input varies in time. The predetermined frequency is determined by the characteristics of the components used in the time encoder circuit, which determine the speed of toggling of the loop formed by hysteresis quantizer 104 and summing integrator 102. For example, as disclosed in U.S. Pat. No. 7,403,144, normalized unitary values for all components of the time encoder circuit disclosed there lead to a frequency having a cycle time with a value of about 4 seconds. According to an embodiment of the present disclosure, the predetermined frequency generated by the time encoder circuit 96 shown in FIG. 6 can for example be varied by changing the gain of the integrator 102.

According to an embodiment of the present disclosure, the predetermined frequency remains generally unchanged, but it may change slightly when the value of the analog input signal varies strongly in time. For example, the predetermined frequency may change by a few percents when the value of the analog input signal varies across its full range, due to the structure of time encoder circuit 80. It is noted that such variations of the predetermined frequency do not impair the operation of a liquid state machine pulse domain neural processor circuit of the present disclosure. According to an embodiment of the present disclosure, the time encoder circuit can comprise a control loop (not shown) that compares the predetermined frequency produced by the time encoder circuit to a reference frequency and controls in return the gain of integrator 102 to match the two frequencies, so as to prevent variations of the predetermined frequency.

Figure 7:
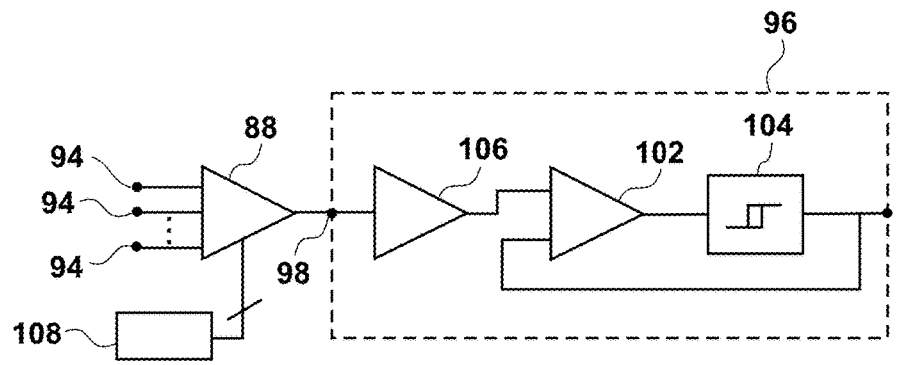
FIG. 7 illustrates an alternative embodiment of a time encoder of the processing cell of FIG. 5.

FIG. 7 illustrates an alternative embodiment to the time encoder circuit circuit 96 of FIG. 5, which comprises a non-linear limiter 106 between summing integrator 102 and the input 98 of the time encoder circuit 96. According to an embodiment of the present disclosure, non-linear limiter 106 comprises a limiting amplifier that provides adjustable gain and clipping levels to implement a hyperbolic tangent nonlinearity in the signal path. According to an embodiment of the present disclosure, if the nonlinearity is not required, the clipping levels can be set beyond the signal swing of the input voltage, effectively disabling the nonlinearity. According to an embodiment to the present disclosure, summing circuit 88 can be a summing integrator having its inputs coupled to the outputs 94 of controllable weighing circuits 90. According to an embodiment of the present disclosure, where summing circuit 88 is a summing integrator, summing circuit 88 can be a lossy summing integrator. According to an embodiment of the present disclosure, summing circuit 88 can have a variable gain for each of its inputs, which can for example depend each on a 16-bit gain coefficient stored in a programmable memory 108. According to an embodiment of the present disclosure, where summing circuit is a loss summing integrator, it can comprise a feedback resistor, tunable by 256 steps.

Figure 8:
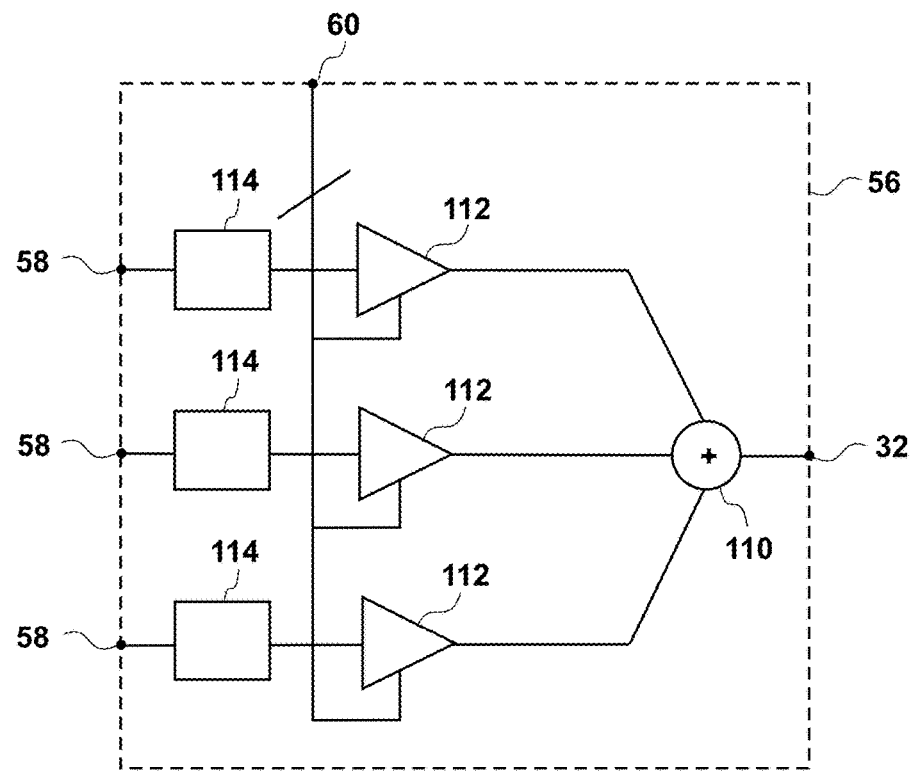
FIG. 8 illustrates a trainable processing cell of the circuit of FIG. 2.

FIG. 8 illustrates a trainable or adaptive processing cell 56 of the asynchronous trainable readout map circuit 26. According to an embodiment of the present disclosure, trainable processing cell 56 comprises a summing circuit 110 having as many inputs as the trainable asynchronous pulse domain processing cell has input ports 58, and having an output coupled to the output port 32 of cell 56. According to an embodiment of the present disclosure, trainable processing cell 56 comprises a plurality of controllable weighing circuits 112 having each an input coupled to an input port 58 and an output coupled to an input of the summing circuit 110. According to an embodiment of the present disclosure, trainable processing cell 56 comprises a plurality of delay circuits 114 coupled each between input port 58 and the input of the controllable weighing circuit 112 that is coupled to the input port 58. According to an embodiment of the present disclosure, the delay introduced by delay circuits 114 is programmable and can be null. According to an embodiment of the present disclosure, controllable weighing circuits 112 have each a weighing port 60.

Figure 9:
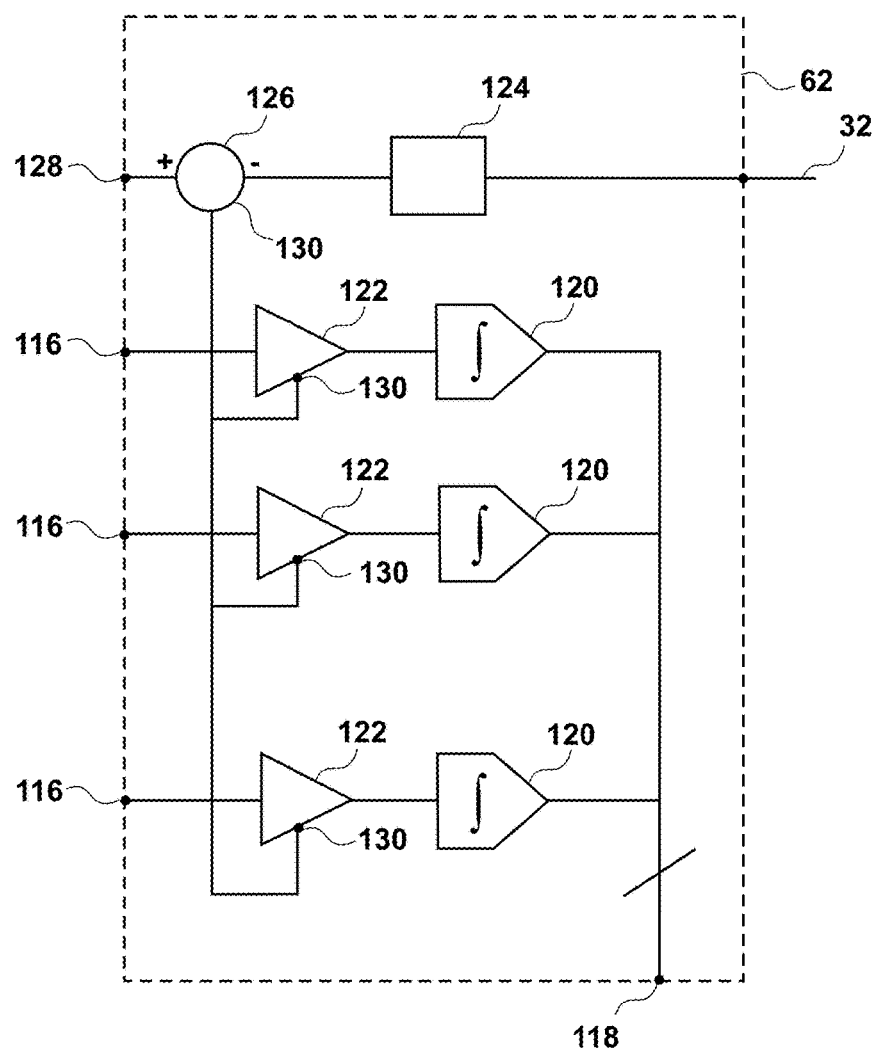
FIG. 9 illustrates an adaptation cell of the circuit of FIG. 2.

FIG. 9 illustrates an adaptation cell 62 of the asynchronous trainable readout map circuit 26. According to an embodiment of the present disclosure, adaptation cell 62 comprises a number of input ports 116 coupled each to an input port 58 of trainable processing cell 56. According to an embodiment of the present disclosure, adaptation cell 62 comprises a number of output ports 118 equal to the number of input ports 116, an equal number of integrator circuits 120 and an equal number of controllable weighing circuits 122. According to an embodiment of the present disclosure, each integrator circuit 120 has an input connected to the output of a controllable weighing circuit 122 and an output connected to an output port 118, the input of the controllable weighing circuit 122 being coupled to an input port 116. According to an embodiment of the present disclosure, each adaptation cell 62 is associated to a trainable asynchronous pulse domain processing cell 56. According to an embodiment of the present disclosure, each input port 116 of each adaptation cell 62 is coupled to an input port 58 of the trainable asynchronous pulse domain processing cell 56 associated to the adaptation cell 62. According to an embodiment of the present disclosure, each output port 118 of each adaptation cell 62 is associated, via an integrator circuit 120 and a weighing circuit 122, to an input port 116 of cell 62 and therefore to an input port 58 of the trainable asynchronous pulse domain processing cell 56 associated to cell 62. According to an embodiment of the present disclosure, each output port 118 thus associated to an input port 58, is coupled to the weighing port 60 associated to said input port 58.

According to an embodiment of the present disclosure, each adaptation cell 62 comprises a low pass filter 124 having an input connected to the output port 32 of the trainable asynchronous pulse domain processing cell 56 associated to cell 62. According to an embodiment of the present disclosure, each adaptation cell 62 further comprises a subtractor circuit 126 for subtracting the output of the low pass filter 124 to a signal received on a training signal input port 128. According to an embodiment of the present disclosure, training signal input port 128 is provided for receiving a training target output signal during a training period. According to an embodiment of the present disclosure, each controllable weighing circuit 122 has a weighing control input port 130 coupled to the output 132 of the subtractor circuit 126. According to an embodiment of the present disclosure, each adaptation cell 62 is provided for generating on output ports 118 weighing factors that depend on the integration, over a training period, of the difference between a low pass filtering by filter 124 of the signal output on the output port 32 of its associated trainable asynchronous pulse domain processing cell 56 and a training target output signal received on training signal input port 128.

An embodiment of the present disclosure relates to a method of processing a series of analog input signals; the method comprising providing a liquid state machine pulse domain neural processor circuit such as circuit 22, having an asynchronous input filter circuit such as circuit 24, provided for at any given time receiving a series of analog input signals on input ports 28 and generating in response on asynchronous nodes 30 a set of time-encoded values that depends on the series of analog input signals received at said given time and before said given time. The method further comprises providing an asynchronous trainable readout map circuit such as circuit 26 for transforming at least a portion of said set of time encoded values on asynchronous nodes 30 into output signals on output ports 30. The method further comprises providing training analog input signals to input ports 28 of the asynchronous input filter circuit 24 as well as corresponding training output signals on ports 128 of the asynchronous trainable readout map circuit 26 during a training period. The method further provides, after the training period, providing on input ports 28 analog input signals to be processed to the asynchronous input filter circuit and outputting on output ports 32 the corresponding output signals from the asynchronous trainable readout map circuit 26.

According to an embodiment of the present disclosure, providing analog input signals to be processed to the input ports 28 of the asynchronous input filter circuit 24 comprises generating, for each analog input such as signal 40, a corresponding pulse signal such as pulse signal 42 comprising a series of pulses having a predetermined frequency and having a duty cycle that depends on the value of the analog input signal; and providing each pulse signal to at least one of a plurality of asynchronous pulse domain processing cells 44 programmably interconnected for forming a processing network.

According to an embodiment of the present disclosure, providing pulse signals to an asynchronous pulse domain processing cell 44 comprises summing the pulse signals, for example with an adder such as summing circuit 88, and generating a time encoded output pulse signal comprising a series of pulses having said predetermined frequency and having a duty cycle that depends on the value of the sum of the pulse signals, for example with a circuit such as time encoder circuit 96.

According to an embodiment of the present disclosure, the method further comprises assigning a predetermined weighing factor to each pulse signal prior to summing the pulse signals, for example using controllable weighing circuits 90. According to an embodiment of the present disclosure, summing the pulse signals comprises calculating a lossy summing integration of the pulse signals.

According to an embodiment of the present disclosure, the method further comprises providing the pulse signals output by said processing network of cells 44 on asynchronous nodes 30 to trainable asynchronous pulse domain processing cells such as cells 56. According to an embodiment of the present disclosure, providing the pulse signals to a trainable asynchronous pulse domain processing cell such as a cell 56 comprises generating an output signal equal to the sum of the weighed pulse signals, for example calculated by summing circuit 110, wherein the pulse signals are weighed, for example by controllable weighing circuits 112, with the integration over a training period of said pulse signals during said training period, said pulse signals during said training period being themselves weighed, for example by controllable weighing circuits 122, with the difference during said training period between a low pass filtering of the sum of said pulse signals and a training expected output value. According to an embodiment of the present disclosure, said difference is for example calculated by subtractor circuit 126.

According to an embodiment of the present disclosure, the method further comprising delaying each pulse signal prior to summing the pulse signals, for example with delay circuits 114. According to an embodiment of the present disclosure, the delay introduced by delay circuits 114 can be used to compensate for propagation delays in the network of cells 44. According to an embodiment of the present disclosure, the delay introduced by delay circuits 114 can be used to delay the signal from predetermined asynchronous nodes 30, for example to allow, with appropriate programming of switches 66, supplying processing cells 56 with signals generated on chosen asynchronous nodes at a given time, as well as with signals generated on the same asynchronous nodes at a previous time. According to an embodiment of the present disclosure, receiving on processing cells 56 signals generated at a given time as well as at a previous time can be used to process time-sensitive information such as image pictures in motion detection processes.

According to an embodiment of the present disclosure, the elements of circuit 22 can be implemented with Asynchronous Pulse Processing circuitry, the output waveforms are bi-valued signals with zero-crossing times that encode the information in the signal. According to an embodiment of the present disclosure, such signals can efficiently be distributed with high fidelity using hardware common to digital logic signals and interconnections can be implemented using digital logic, or with digital crosspoint switches. According to an embodiment of the present disclosure, FPGA or CPLD circuits such as off-the-shelf FPGA or CPLD circuits can be used to implement the elements of circuit 22, at least because programmable elements allow flexible connectivity, because the standard digital logic I/Os are compatible with the bi-valued TE waveforms, and because the number of physical pins allows for one CPLD to provide full routability between a number of nodes. One restriction on the use of CPLDs to perform TE signal routing is that the TE waveforms must not be synchronized to a global clock. Rather, the CPLD should operate without a clock, and implement the crosspoint switch asynchronously. This mode of operation preserves the time-encoded information, whereas a clocked implementation would corrupt the time-encoded information. One example of commercial chip implementing a CPLD circuit is Altera MAX II ("MAX II Device Handbook", Altera Corporation, August 2009).

The inventors have constructed a circuit 22 comprising 32 processing cells 44, using off-the shelf elements mounted on a custom PCB. Such circuit includes Altera MAX II chips ("MAX II Device Handbook", Altera Corporation, August 2009) and LT6230 and LT6232 Operational Amplifier chips ("LT6230/LT6231/LT6232 datasheet", Linear Technology Corporation).

Each processing cell 44 was arranged such that its time encoder 96 could programmably be chosen such as illustrated in FIG. 6 or such as illustrated in FIG. 7. Full routability between the processing cells 44 was achieved with the use of CPLD-based asynchronous crosspoint switches. The processing cells 44 were operating at 2 MHz. However, the Inventors have determined that an IC implementation according to embodiments of the present disclosure can operate from 100 Hz to ~30 GHz, with a typical efficiency (speed×accuracy/Power) of more than $2 \times 10^{12}$ Hz/Watt.

Figure 10:
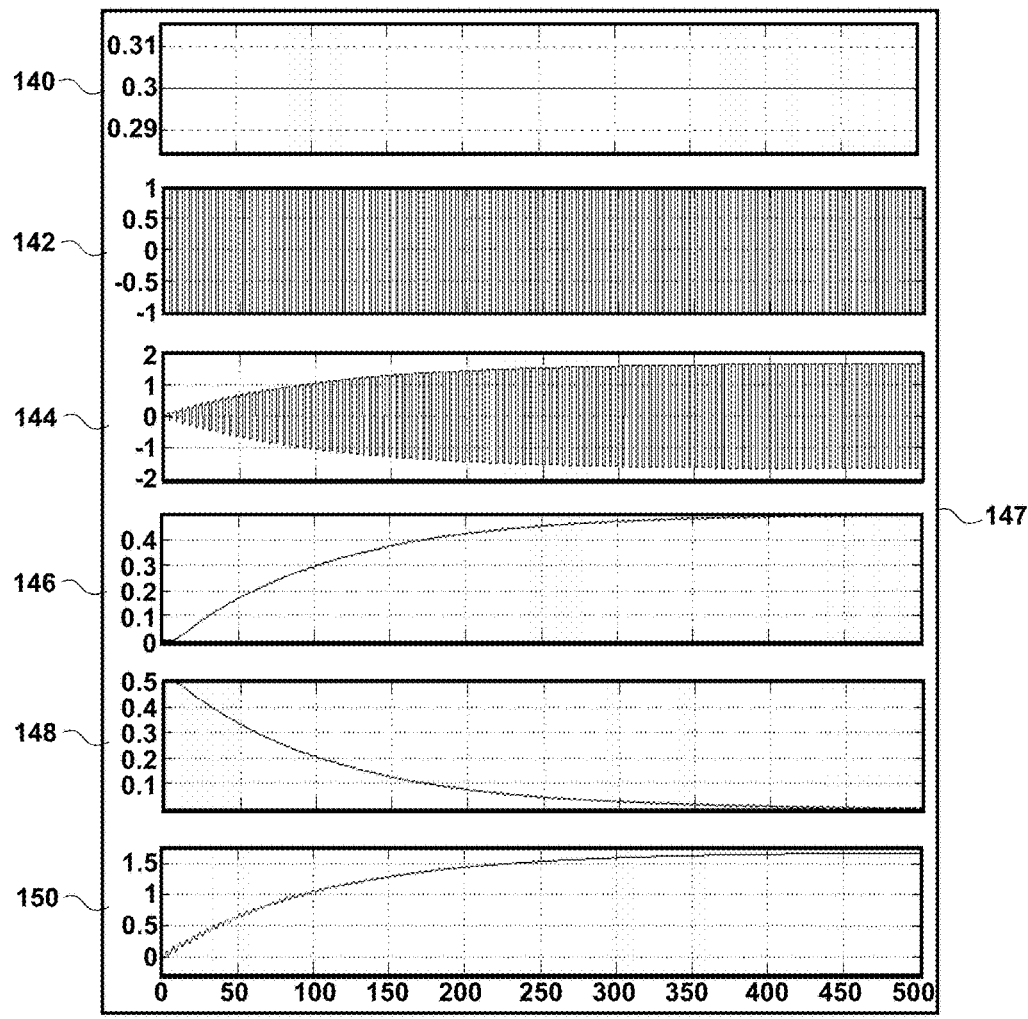
FIG. 10 illustrates the simulation of key parts of the pulse domain circuit of FIG. 2 during training and operation.

FIG. 10 shows the evolution with time of the signals present on a number of nodes of circuit 22 during training and operation. Reference 140 represents an input signal such as signal 40 supplied to an input port 28. In this particular example this signal has a constant value over time of 0.3V. Reference 142 represents a pulse signal such as signal 42 generated on an output port 38 by input driver 34 in response to signal 140. Signal 142 is a pulse domain signal that has two possible amplitude values (for example +1V and −1V). The timing of the pulses encode the signal information. In this particular example, because input signal 140 has a constant value over time, output signal 142 has a constant duty cycle.

Reference 144 represents an output signal such as generated on an output port 32 of a trainable asynchronous pulse domain processing cells 56 in response to a signal such as a signal 142 being supplied to processing cell 56. Signal 44 illustrates the effect over time of the weighing, for example by a weighing circuit 112, of the input signal received in processing cell 56. Reference 146 represents a low-pass filtering of signal 144, such as generated by filter 124 of an adaptation cell 62. Reference 147 represents a training value such as would be supplied on port 128 of adaptation cell 62 during a training period, for example between time 0 and 450 in FIG. 10. In the example illustrated, the output target level 147 has a value of 0.5V. The circuit 22 adapts the weights to make the low pass version 146 of signal 144 equal to the level 147.

Reference 148 represents an "error" signal such as would be output by a subtractor 126 that would subtract signal 146 to a training signal having the output target level indicated by reference 147.

Reference 150 represents the value of the weighing factor that would be output on port 118 of adaptor cell 62 in response to signal 142 being provided on an input port 116, with error signal 148 being generated in output of subtractor 126.

According to an embodiment of the present disclosure, this weighing factor is used to adjust the gain of a corresponding weighing circuit 112; for example a 1-bit DAC. Weighing factor 150 evolves until it settle to the value (~1.6 V in the example) in which the internal "error" becomes zero.

The foregoing description of the preferred embodiments of the present disclosure has been presented for purposes of illustration and description. It is not intended to be exhaustive or to limit the disclosure to the precise form or to exemplary embodiments disclosed. Obviously, many modifications and variations will be apparent to practitioners skilled in this art. Similarly, any process steps described might be interchangeable with other steps in order to achieve the same result. The embodiment was chosen and described in order to best explain the principles of the disclosure and its best mode practical application, thereby to enable others skilled in the art to understand the disclosure for various embodiments and with various modifications as are suited to the particular use or implementation contemplated.

It is intended that the scope of the disclosure be defined by the claims appended hereto and their equivalents. Reference to an element in the singular is not intended to mean "one and only one" unless explicitly so stated, but rather means "one or more." Moreover, no element, component, nor method step in the present disclosure is intended to be dedicated to the public regardless of whether the element, component, or method step is explicitly recited in the following claims. No claim element herein is to be construed under the provisions of 35 U.S.C. Sec. 112, sixth paragraph, unless the element is expressly recited using the phrase "means for . . . ."

It should be understood that the figures illustrated in the attachments, which highlight the functionality and advantages of the present disclosure, are presented for example purposes only. The architecture of the present disclosure is sufficiently flexible and configurable, such that it may be utilized (and navigated) in ways other than that shown in the accompanying figures.

Furthermore, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way. It is also to be understood that the steps and processes recited in the claims need not be performed in the order presented.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art

The invention claimed is:

1. A liquid state machine pulse domain neural processor circuit comprising:
   an asynchronous input filter circuit provided for, at any given time, receiving a series of analog input signals and generating in response a set of time-encoded values that depend on the series of analog input signals received at said given time and before said given time; and
   an asynchronous trainable readout map circuit for transforming at least a portion of said set of time encoded values into output signals; wherein:
   said generating a set of time-encoded values that depend on the series of analog input signals received at said given time and before said given time comprises receiving each analog input signal on a distinct input driver input port and outputting a corresponding pulse signal comprising a series of pulses having a predetermined frequency and having a duty cycle that depends on the value of the analog input signal.

2. The liquid state machine pulse domain neural processor circuit of claim 1 wherein the asynchronous input filter circuit comprises:
   an input driver circuit arranged for said receiving each analog input signal on a distinct input driver input port and for said outputting, on a corresponding input driver output port, said pulse signal comprising a series of pulses having a predetermined frequency and having a duty cycle that depends on the value of the analog input signal;
   a plurality of asynchronous nodes;
   a plurality of asynchronous pulse domain processing cells having each an output port and a plurality of input ports;
   a plurality of input port switches for controllably connecting any input port of any asynchronous pulse domain processing cell to any input driver output port;
   a plurality of node switches for controllably connecting any asynchronous node to any input port of any asynchronous pulse domain processing cell; and
   a plurality of output port switches for controllably connecting the output port of any asynchronous pulse domain processing cell to any asynchronous node.

3. The liquid state machine pulse domain neural processor circuit of claim 2 wherein the input port switches, node switches and output port switches are controllable such that at any given time the asynchronous input filter generates on the plurality of asynchronous nodes said set of time-encoded values that depends on the series of analog input signals received at said given time and before said given time.

4. The liquid state machine pulse domain neural processor circuit of claim 2, wherein each asynchronous pulse domain processing cell comprises:
   a summing circuit having as many inputs as the asynchronous pulse domain processing cell has input ports;
   a plurality of controllable weighing circuits having each an input coupled to an input port of the asynchronous pulse domain processing cell and an output coupled to an input of the summing circuit; and
   a time encoder circuit having an input coupled to the output of the summing circuit.

5. The liquid state machine pulse domain neural processor circuit of claim 4, wherein the time encoder circuit comprises:
   a two input summing integrator having an input coupled to the input of the time encoder circuit; and
   a hysteresis quantizer having an input coupled to the output of the two input summing integrator and an output coupled to the output of the time encoder circuit;
   wherein the output of the hysteresis quantizer is also connected to the second input of the two-input summing integrator.

6. The liquid state machine pulse domain neural processor circuit of claim 5, wherein the summing circuit of the asynchronous pulse domain processing cell is a lossy summing integrator.

7. The liquid state machine pulse domain neural processor circuit of claim 6, comprising a non linear limiter between the lossy summing integrator and the input of the time encoder circuit.

8. The liquid state machine pulse domain neural processor circuit of claim 4, wherein each controllable weighing circuit comprises a one-bit DAC arranged for receiving a pulse input signal having input signal levels and for generating an output signal identical to the input signal but having output signal levels that differ from the input signal levels by a programmable factor.

9. The liquid state machine pulse domain neural processor circuit of claim 6, wherein each a one-bit DAC has an adjustable gain controlled by a DAC receiving in input a digital value stored in a programmable memory.

10. The liquid state machine pulse domain neural processor circuit of claim 2 wherein the asynchronous trainable readout map circuit comprises:
    a plurality of trainable asynchronous pulse domain processing cells having each an output port and a plurality of input ports associated each to a weighing port;
    a plurality of adaptation cells associated each to a trainable asynchronous pulse domain processing cell; each adaptation cell being provided for:
       receiving the signal output on the output port of its associated trainable asynchronous pulse domain processing cell;
       receiving a training target output signal; and
       supplying weighing factors to the weighing ports of its associated trainable asynchronous pulse domain processing cell; and
    a plurality of readout map switches for controllably connecting any asynchronous node of the input filter circuit to any input port of any trainable asynchronous pulse domain processing cell.

11. The liquid state machine pulse domain neural processor circuit of claim 10 wherein each adaptation cell is provided for generating weighing factors that depend on the integration, over a training time, of the difference between a low pass filtering of said signal output on the output port of its associated trainable asynchronous pulse domain processing cell and said training target output signal.

12. The liquid state machine pulse domain neural processor circuit of claim 10 wherein each trainable asynchronous pulse domain processing cell comprises:
- a summing circuit having as many inputs as the trainable asynchronous pulse domain processing cell has input ports; and
- a plurality of controllable weighing circuits having each an input coupled to an input port of the asynchronous pulse domain processing cell and an output coupled to an input of the summing circuit.

13. The liquid state machine pulse domain neural processor circuit of claim 12 wherein each trainable asynchronous pulse domain processing cell comprises a delay circuit between each input port and the input of the controllable weighing circuit that is coupled to the input port.

14. The liquid state machine pulse domain neural processor circuit of claim 12 wherein each adaptation cell comprises:
- a low pass filter having an input connected to the output port of its associated trainable asynchronous pulse domain processing cell;
- a subtractor circuit for subtracting the output of the low pass filter to a training target output signal received on a training signal input port;
- a plurality of controllable weighing circuits having each an input coupled to an input port of its associated trainable asynchronous pulse domain processing cell, and a weighing control input coupled to the output of the subtractor circuit; and
- a plurality of integrator circuits having each an input connected to the output of a controllable weighing circuit and an output connected to the weighing port associated to the input port to which the controllable weighing circuit is connected.

15. A method of processing a series of analog input signals; the method comprising:
- providing a liquid state machine pulse domain neural processor circuit having an asynchronous input filter circuit provided for, at any given time, receiving a series of analog input signals and generating in response a set of time-encoded values that depends on the series of analog input signals received at said given time and before said given time; and an asynchronous trainable readout map circuit for transforming at least a portion of said set of time encoded values into output signals;
- providing training analog input signals to the asynchronous input filter circuit as well as corresponding training output signals to the asynchronous trainable readout map circuit during a training period; and
- after the training period, providing analog input signals to be processed to the asynchronous input filter circuit and outputting the corresponding output signals from the asynchronous trainable readout map circuit; wherein:

said generating a set of time-encoded values that depend on the series of analog input signals received at said given time and before said given time comprises receiving each analog input signal on a distinct input driver input port and outputting a corresponding pulse signal comprising a series of pulses having a predetermined frequency and having a duty cycle that depends on the value of the analog input signal.

16. The method of claim 15, wherein providing analog input signals to be processed to the asynchronous input filter circuit comprises:
- providing each of said corresponding pulse signal to at least one of a plurality of asynchronous pulse domain processing cells programmably interconnected for form a processing network.

17. The method of claim 16 wherein providing pulse signals to an asynchronous pulse domain processing cell comprises:
- summing the pulse signals and generating an output pulse signal comprising a series of pulses having said predetermined frequency and having a duty cycle that depends on the value of the sum of the pulse signals.

18. The method of claim 17, further comprising assigning a predetermined weighing factor to each pulse signal prior to summing the pulse signals.

19. The method of claim 17, wherein summing the pulse signals comprises calculating a lossy summing integration of the pulse signals.

20. The method of claim 17, further comprising providing pulse signals output by said processing network to trainable asynchronous pulse domain processing cells, wherein said providing pulse signals to a trainable asynchronous pulse domain processing cell comprises:
- generating an output signal comprising the sum of said pulse signals;
- wherein said pulse signals are weighed with the integration over said training period of said pulse signals during said training period, said pulse signals during said training period being themselves weighed with the difference during said training period between a low pass filtering of the sum of said pulse signals and a training expected output value.

21. The method of claim 20, further comprising delaying each pulse signal prior to summing the pulse signals.

* * * * *